(12) United States Patent
Agalgaonkar et al.

(10) Patent No.: US 11,805,873 B1
(45) Date of Patent: Nov. 7, 2023

(54) STAND FOR PORTABLE ELECTRONIC DEVICE

(71) Applicant: Pioneer Square Brands, Inc., Seattle, WA (US)

(72) Inventors: Sudeep Balkrishna Agalgaonkar, Jamestown, NC (US); Riley Edwin Lynch, Greensboro, NC (US)

(73) Assignee: Pioneer Square Brands, Inc., McLean, VA (US)

( * ) Notice: Subject to any disclaimer, the term of this patent is extended or adjusted under 35 U.S.C. 154(b) by 0 days.

(21) Appl. No.: 18/224,528

(22) Filed: Jul. 20, 2023

Related U.S. Application Data

(63) Continuation-in-part of application No. 18/224,484, filed on Jul. 20, 2023.

(51) Int. Cl.
- *A47B 23/04* (2006.01)
- *A45C 11/00* (2006.01)
- *F16M 11/06* (2006.01)

(52) U.S. Cl.
CPC ............. *A45C 11/00* (2013.01); *F16M 11/06* (2013.01); *A45C 2011/003* (2013.01)

(58) Field of Classification Search
None
See application file for complete search history.

(56) References Cited

U.S. PATENT DOCUMENTS

| | | | |
|---|---|---|---|
| 8,100,376 B2* | 1/2012 | Ye | F16M 13/00 248/455 |
| 8,746,638 B2* | 6/2014 | Carney | H04M 1/0202 248/176.1 |
| 8,950,720 B1* | 2/2015 | Carr | F16M 11/38 248/460 |
| 9,194,536 B2* | 11/2015 | Kim | G06F 1/16 |
| 9,249,922 B2* | 2/2016 | Haarburger | A47B 23/042 |
| 9,364,081 B1* | 6/2016 | Haymond | A47B 23/044 |
| 9,377,810 B2* | 6/2016 | Hishinuma | G06F 1/1613 |
| 10,078,346 B2* | 9/2018 | Lay | F16M 11/38 |
| 10,362,697 B2* | 7/2019 | Yuan | H05K 5/0234 |
| 11,563,838 B1* | 1/2023 | Sham | H04M 1/12 |
| 11,627,213 B2* | 4/2023 | Linden | F16M 13/00 455/575.1 |
| 2010/0213331 A1* | 8/2010 | Liou | F16M 11/2021 248/176.3 |
| 2011/0297566 A1* | 12/2011 | Gallagher | F16M 11/105 206/320 |
| 2017/0292647 A1* | 10/2017 | Loudon | F16M 11/38 |
| 2019/0198212 A1* | 6/2019 | Levy | F16M 11/2021 |

\* cited by examiner

*Primary Examiner* — Xanthia C Relford
(74) *Attorney, Agent, or Firm* — Grandview Law

(57) ABSTRACT

Systems involve implementations such as a stand system for a portable electronic device including a base assembly including a lower assembly, a fastener, an upper assembly being coupled with the lower assembly via at least in part the fastener, and a cover assembly including a cover member, coupled with the upper assembly, the cover member being having closed and open positions to block and allow access to the fastener, respectively. Other aspects are described in the claims, drawings, and text forming a part of the present disclosure.

20 Claims, 23 Drawing Sheets

ND FOR PORTABLE ELECTRONIC DEVICE

SUMMARY

In one or more aspects a stand system for a portable electronic computing device including (I) a base assembly including (A) a lower assembly, (B) at least one fastener, (C) an upper assembly including an exterior face, the upper assembly being couplable with the lower assembly via at least in part the at least one fastener, and (D) a cover assembly including a cover member, the cover assembly being couplable with the upper assembly, the cover member being positionable in at least a closed position and an open position when the cover assembly is coupled with the upper assembly, (II) a wall assembly including a wall portion with an exterior face, the wall assembly couplable to the base assembly, and (III) a support assembly extending perpendicularly with respect to the exterior face of the wall portion, wherein when the upper assembly of the base assembly is coupled to the lower assembly of the base assembly via at least in part the at least one fastener and when the cover assembly is coupled to the upper assembly, the cover member blocks access to the at least one fastener if the cover member is in the closed position and the cover member allows for access to the at least one fastener if the cover member is in the open position, and wherein when the upper assembly is coupled to the lower assembly of the base assembly and the wall assembly is coupled to the base assembly, the exterior face of the wall portion of the wall assembly extends perpendicularly with respect to the exterior face of the upper assembly of the base assembly. Wherein the upper assembly of the base assembly includes at least one protrusion, and wherein the at least one protrusion of the upper assembly of the base assembly couples with the wall portion when the upper assembly of the base assembly is coupled to the wall portion. Wherein the stand assembly includes a first plurality of fasteners, and wherein the lower assembly of the base assembly is at least coupled to the wall portion by the first plurality of fasteners when the lower assembly of the base assembly is coupled to the wall assembly. Wherein the wall assembly includes an engagement member perpendicularly extending with respect to the exterior face of the wall portion, and wherein the first plurality of fasteners are coupled to the engagement member of the wall assembly and are coupled with the lower assembly of the base assembly when the lower assembly of the base assembly is coupled with the wall assembly. Wherein the upper assembly of the base assembly includes an aperture through the exterior face of the upper assembly, and wherein the cover assembly is engaged with the aperture when the cover assembly is coupled with the upper assembly. Wherein the cover assembly includes a housing and a cover member pivotally couplable to the housing, wherein the aperture of the upper assembly of the base assembly is sized to allow a portion of the cover member to protrude through the aperture when the cover assembly is coupled to the upper assembly and the cover member is in the open position as pivotally coupled to the cover assembly. Wherein the cover assembly provides access to the at least one fastener through the aperture of the upper assembly when the cover member of the cover assembly is in the open position and when the upper assembly and the lower assembly of the base assembly are coupled at least in part via the at least one fastener. Wherein the cover assembly blocks access through the aperture of the upper assembly to the at least one fastener when the cover member of the cover assembly is in the closed position and when the upper assembly and the lower assembly of the base assembly are coupled at least in part via the at least one fastener and the cover assembly is in the first position. Wherein the housing of the cover assembly includes a protrusion, wherein the cover member of the cover assembly includes a protrusion, and wherein the protrusion of the housing and the protrusion of the cover member frictionally engage one another when the cover member is in the closed position. Wherein the cover assembly further includes a rod, wherein the housing of the cover assembly includes a first side and a second side, wherein the rod is couplable with the first side and the second side of the housing, wherein the rod extends between the first side and the second side of the housing when the rod is coupled to the first side and the second side, and wherein the cover member is coupled to the rod when the cover member is pivotally coupled to the housing of the cover assembly. Wherein the cover assembly further includes at least one fastener, and wherein housing of the cover assembly is couplable to the upper assembly via the at least one fastener of the cover assembly. Wherein the housing includes an aperture sized and positioned to allow a portion of the cover member to protrude through the aperture when the cover member is in the open position and pivotally coupled to the cover assembly. Wherein the lower assembly of the base assembly includes a notch sized and positioned to allow a portion of the cover member of the cover assembly to partially protrude into the notch when the cover assembly is coupled to the upper assembly of the base assembly, the upper assembly and lower assembly are coupled together, and the cover member is in the open position and pivotally coupled to the cover assembly. Wherein the lower assembly includes a nook-like portion of the lower assembly of the base assembly is shaped and sized to provide space to receive at least a portion of the housing of the cover assembly to be positioned therein when the cover assembly is coupled with the upper assembly and the upper assembly is coupled with the lower assembly.

In one or more aspects a stand system for a portable electronic computing device including (I) a base assembly including (A) an upper assembly, (B) a lower assembly, (C) at least one fastener, and (D) a cover assembly including a rotatably coupled cover member, wherein: (a) the upper assembly is coupled with the lower assembly via at least in part the at least one fastener, (b) the cover assembly is coupled with the upper assembly, (c) the cover member of the cover assembly is rotatably coupled to move between at least a closed position and an open position, (d) the cover member blocks access to the at least one fastener when the cover member is in the closed position, and (e) the cover member allows for access to the at least one fastener if the cover member is in the open position. Wherein the upper assembly includes an aperture, and wherein the cover assembly is accessible through the aperture, wherein the aperture of the upper assembly of the base assembly is sized to allow a portion of the cover member to protrude through the aperture when the cover member is in the open position. Wherein the cover assembly provides access to the at least one fastener through the aperture of the upper assembly when the cover member of the cover assembly is in the open position, and wherein the cover assembly blocks access to the at least one fastener through the aperture of the upper assembly when the cover member of the cover assembly is in the closed position.

In one or more aspects a stand system for a portable electronic computing device including (I) a base assembly including (A) an upper assembly, (B) a lower assembly, (C)

at least one fastener, and (D) a cover assembly including a pivotably coupled cover member, wherein: (a) the upper assembly is coupled with the lower assembly via at least in part the at least one fastener, (b) the cover member of the cover assembly is rotatably coupled to move between blocking access and allowing access to the at least one fastener. Wherein the cover assembly further includes a housing and a rod, wherein the housing of the cover assembly includes a first side and a second side, wherein the rod is couplable with the first side and the second side of the housing, wherein the rod extends between the first side and the second side of the housing when the rod is coupled to the first side and the second side, and wherein the cover member is coupled to the rod. Wherein the housing includes an aperture sized and positioned to allow a portion of the cover member to protrude through the aperture of the housing when the cover member is in the open position.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Stand System for Portable Electronic Device, articles of manufacture, compositions of matter for same that may provide context, for instance, in introducing one or more processes and/or devices described herein.

DETAILED DESCRIPTION

Figure 1:
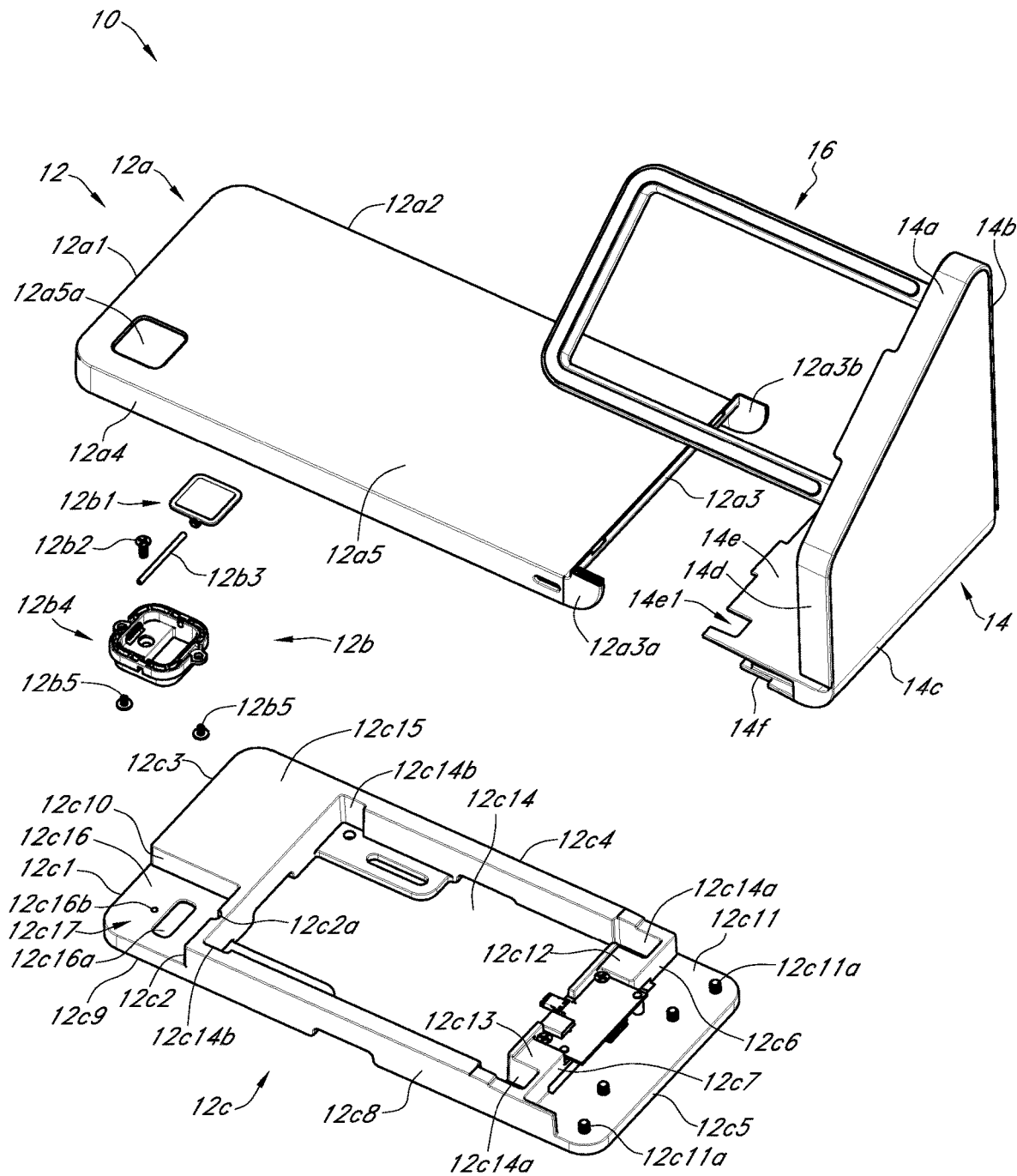
FIG. 1 is a partially exploded rear-top perspective view of a stand assembly.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a partially exploded rear-top perspective view of stand assembly 10. Depicted implementation of stand assembly 10 is shown to include base assembly 12, wall assembly 14, and support assembly 16. Depicted implementation of base assembly 12 is shown to include upper assembly 12a, cover assembly 12b, and lower assembly 12c. Depicted implementation of upper assembly 12a is shown to include side 12a1, side 12a2, side 12a3 with extension 12a3a and extension 12a3b, side 12a4, exterior face 12a5 with aperture 12a5a through exterior face 12a5 of upper assembly 12a. Depicted implementation of cover assembly 12b is shown to include cover member 12b1, fastener 12b2, rod 12b3, housing 12b4, and fastener 12b5.

Depicted implementation of lower assembly 12c is shown to include side 12c1, side 12c2 with notch 12c2a, side 12c3, side 12c4, side 12c5, side 12c6, side 12c7, side 12c8, side 12c9, side 12c10, exterior face 12c11 with fastener 12c11a, exterior face 12c12, upper face 12c13, interior face 12c14, gap 12c14a, gap 12c14b, exterior face 12c15, and exterior face 12c16 with notch 12c16a, aperture 12c16b and nook-like portion 12c17, which is formed with portions therewith as shown in FIG. 1. Furthermore, nook-like portion 12c17 provides space to receive a portion of the housing 12b4 of cover assembly 12b when cover assembly 12b is coupled with upper assembly 12a and upper assembly 12a is coupled with lower assembly 12c as shown, for instance in FIG. 20.

Figure 2:
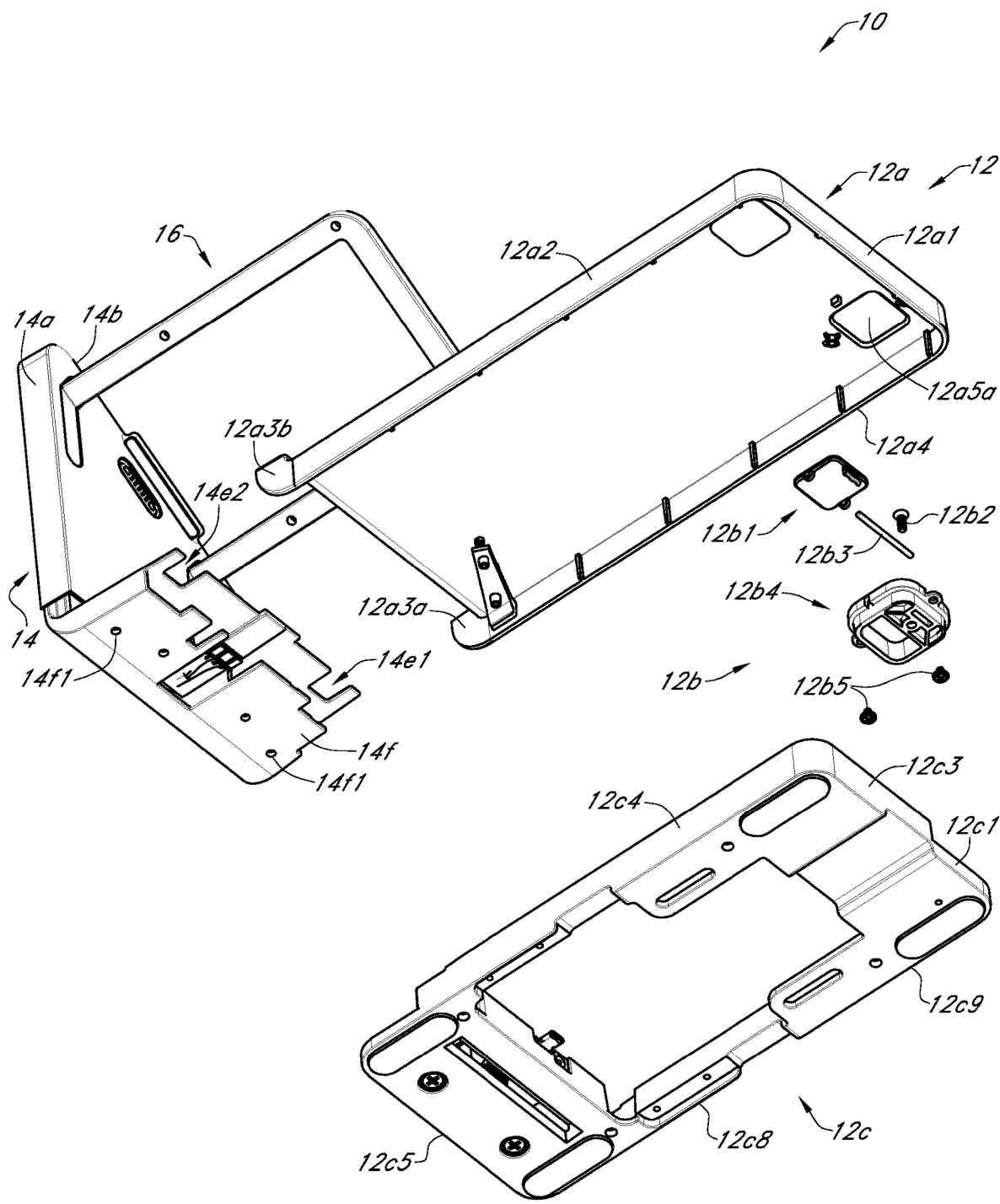
FIG. 2 is a partially exploded front-bottom perspective view of the stand assembly of FIG. 1.

Depicted implementation of wall assembly 14 is shown in FIG. 1 to include side 14a, side 14b, side 14c, side 14d, overlay 14e with notch 14e1, engagement member 14f, and exterior face 14g with engagement member 14f extending perpendicularly with respect to exterior face 14g Turning to FIG. 2, depicted therein is a partially exploded front-bottom perspective view of stand assembly 10. Depicted implementation of overlay 14e is shown to include notch 14e2. Depicted implementation of engagement member 14f with a plurality of aperture 14f1, which couple with a plurality of fastener 12c11a (shown in FIG. 1) to couple engagement member 14f with exterior face 12c11 thereby coupling lower assembly 12c with wall assembly 14.

Figure 3:
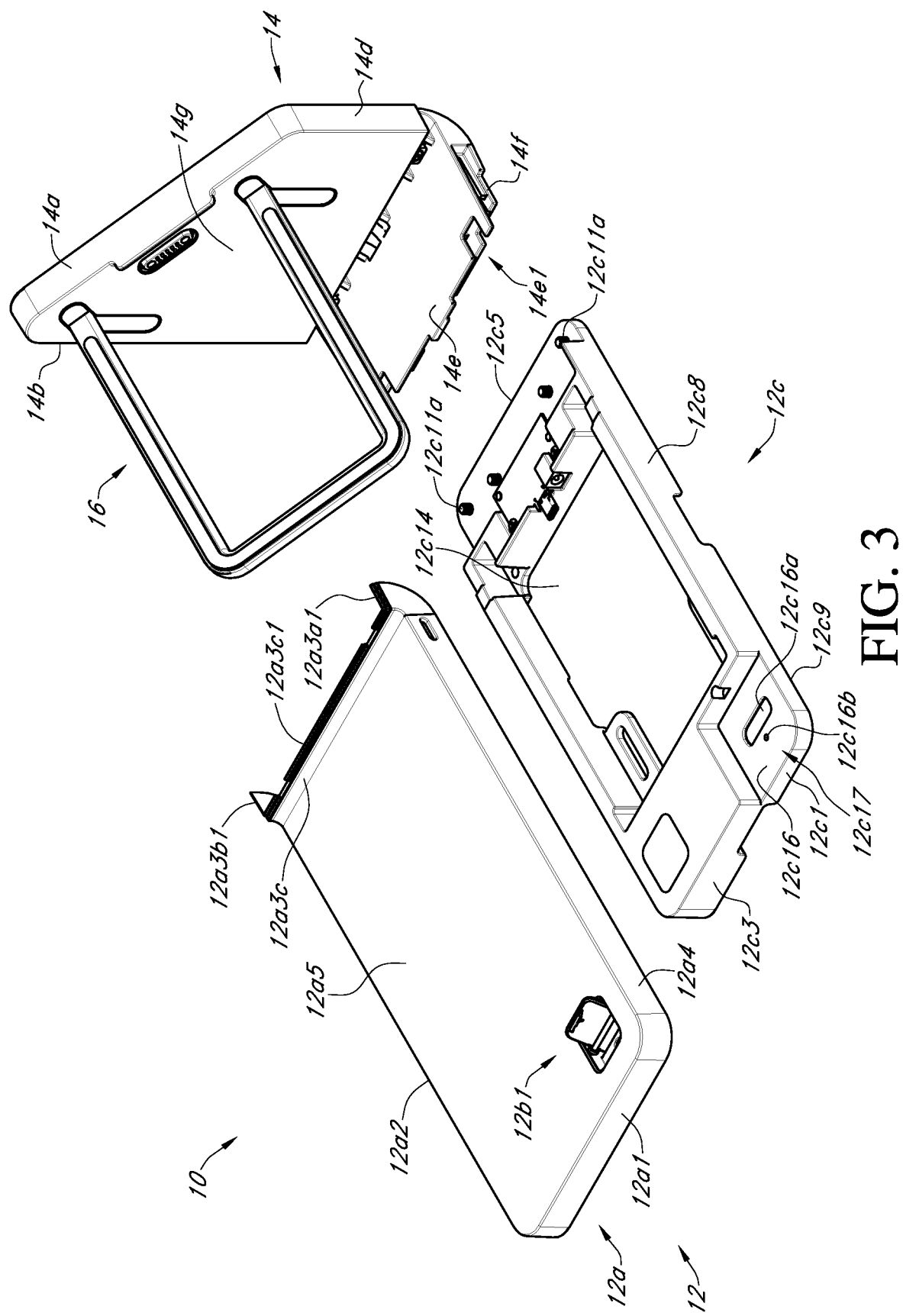
FIG. 3 is a partially exploded front-top perspective view of the stand assembly of FIG. 1.

Turning to FIG. 3, depicted therein is a partially exploded front-top perspective view of stand assembly 10. Depicted implementation of extension 12a3a is shown to include protrusion 12a3a1. Depicted implementation of extension 12a3b is shown to include protrusion 12a3b1. Depicted implementation of side 12a3 is shown to include extension 12a3c with protrusion 12a3c1.

Figure 4:
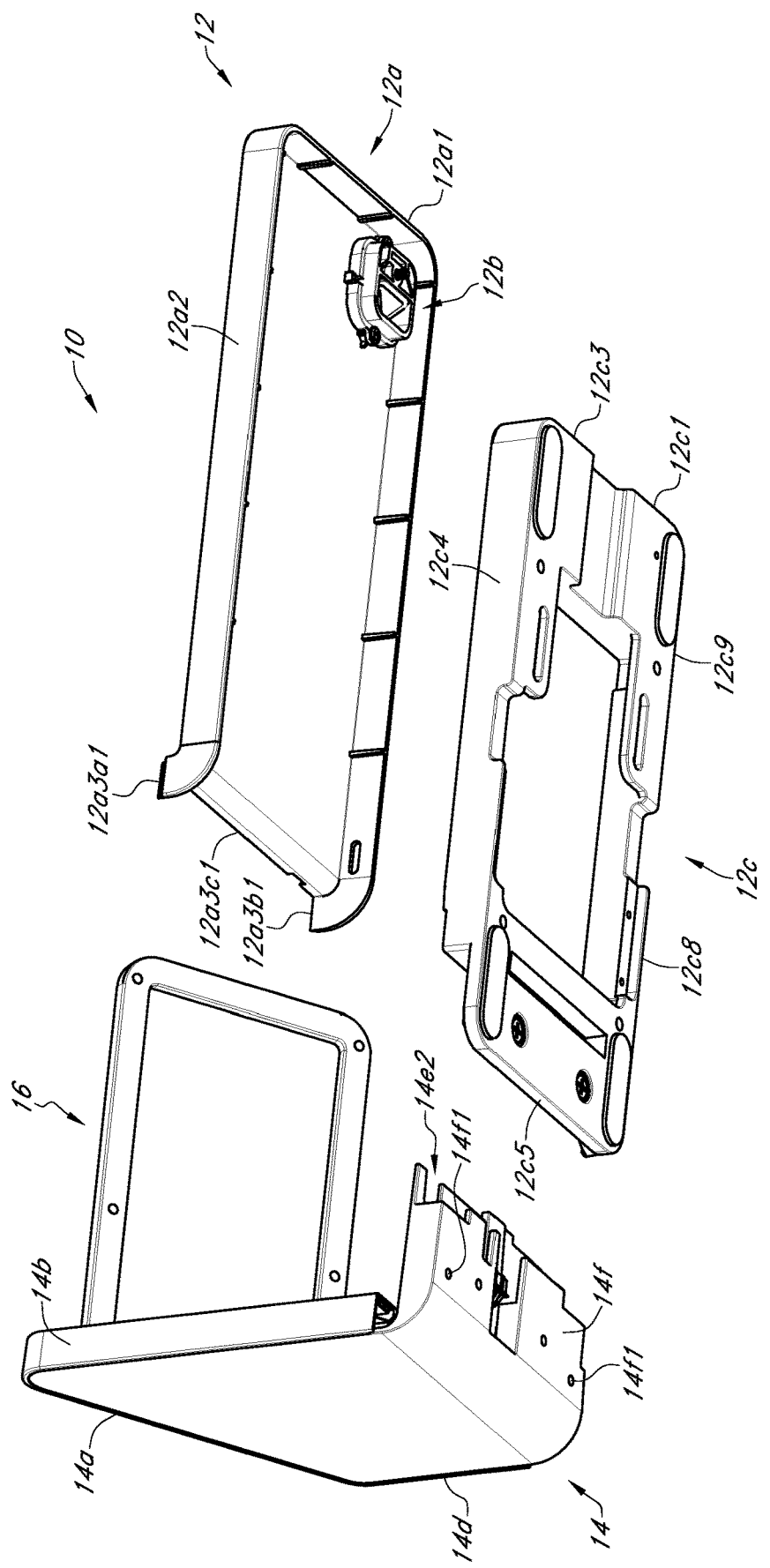
FIG. 4 is a partially exploded rear-bottom perspective view of the stand assembly of FIG. 1.

Turning to FIG. 4, depicted therein is a partially exploded rear-bottom perspective view of stand assembly 10. As depicted, cover assembly 12b is shown engaged with aperture 12a5a as cover assembly 12b is coupled with upper assembly 12a.

Figure 5:
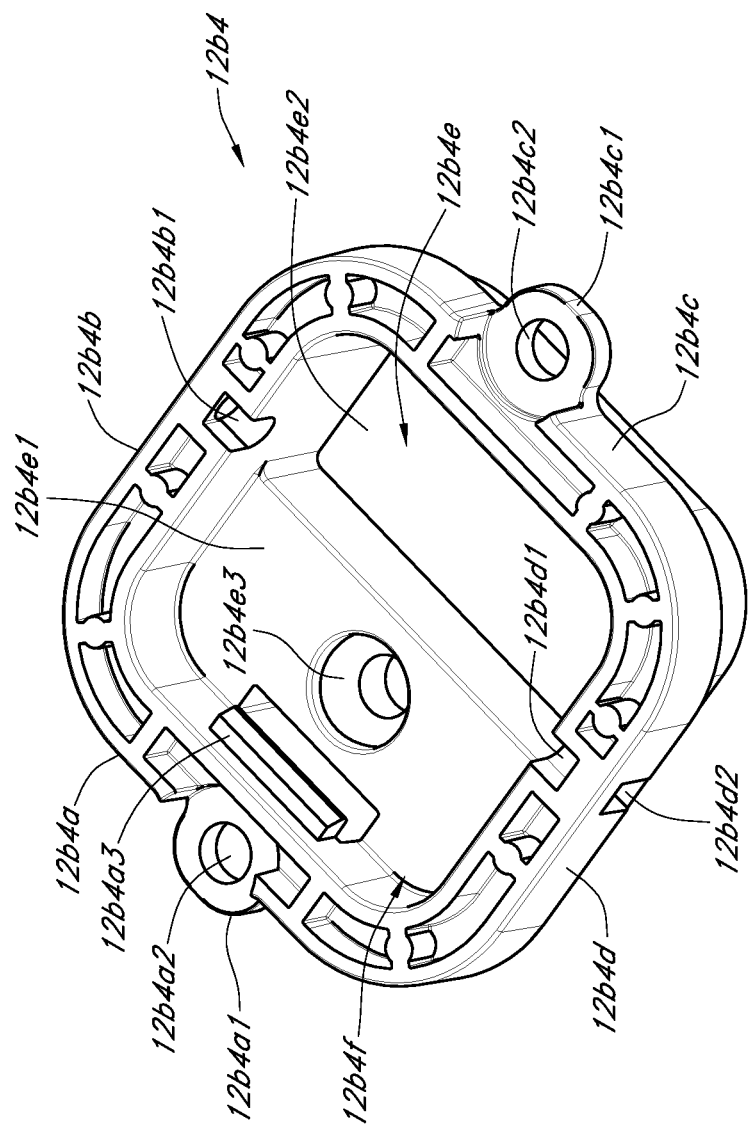
FIG. 5 is a top-perspective view of the housing for the cover assembly shown in FIG. 1.

Turning to FIG. 5, depicted therein is a top-perspective view of housing 12b4 for cover assembly 12b. Depicted implementation of cover assembly 12b is shown to include housing 12b4. Depicted implementation of housing 12b4 includes side 12b4a, side 12b4b, side 12b4c, side 12b4d, recess 12b4e, and interior 12b4f. Depicted implementation of side 12b4a includes protrusion 12b4a1, aperture 12b4a2, and protrusion 12b4a3. Depicted implementation of side 12b4b includes notch 12b4b1. Depicted implementation of side 12b4c includes protrusion 12b4c1 and aperture 12b4c2. Depicted implementation of side 12b4d includes notch 12b4d1, and notch 12b4d2. Depicted implementation of recess 12b4e includes ledge 12b4e1, aperture 12b4e2, and aperture 12b4e3. As depicted, upper assembly 12a is shown coupled with lower assembly 12c via fastener 12b2.

Figure 6:
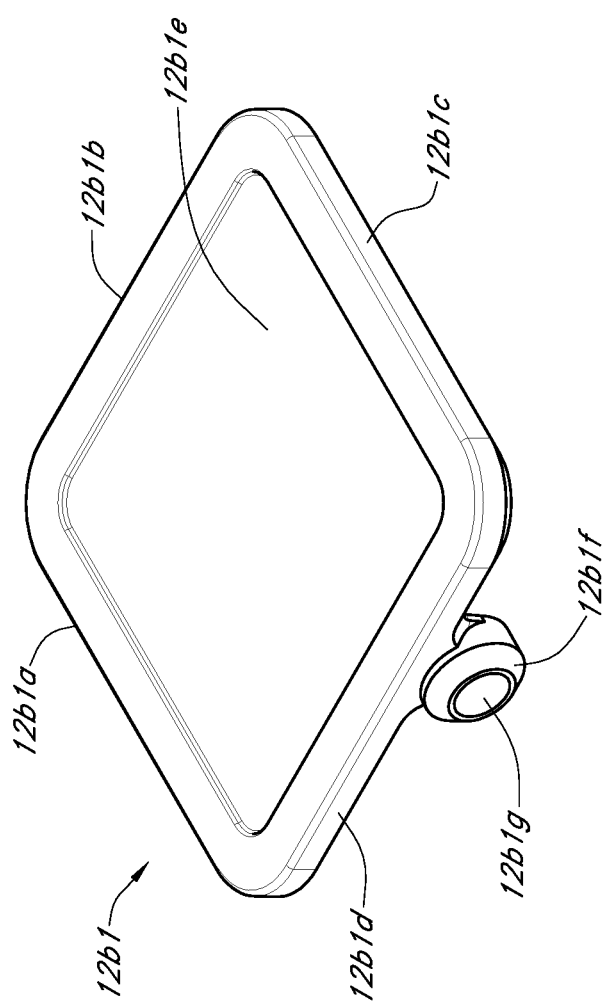
FIG. 6 is a top-perspective view of the cover member for the cover assembly shown in FIG. 1.

Turning to FIG. 6, depicted therein is a top-perspective view of cover member 12b1 of cover assembly 12b. Depicted implementation of cover member 12b1 is shown to include side 12b1a, side 12b1b, side 12b1c, side 12b1d, exterior face 12b1e, protrusion 12b1f, and aperture 12b1g.

Figure 7:
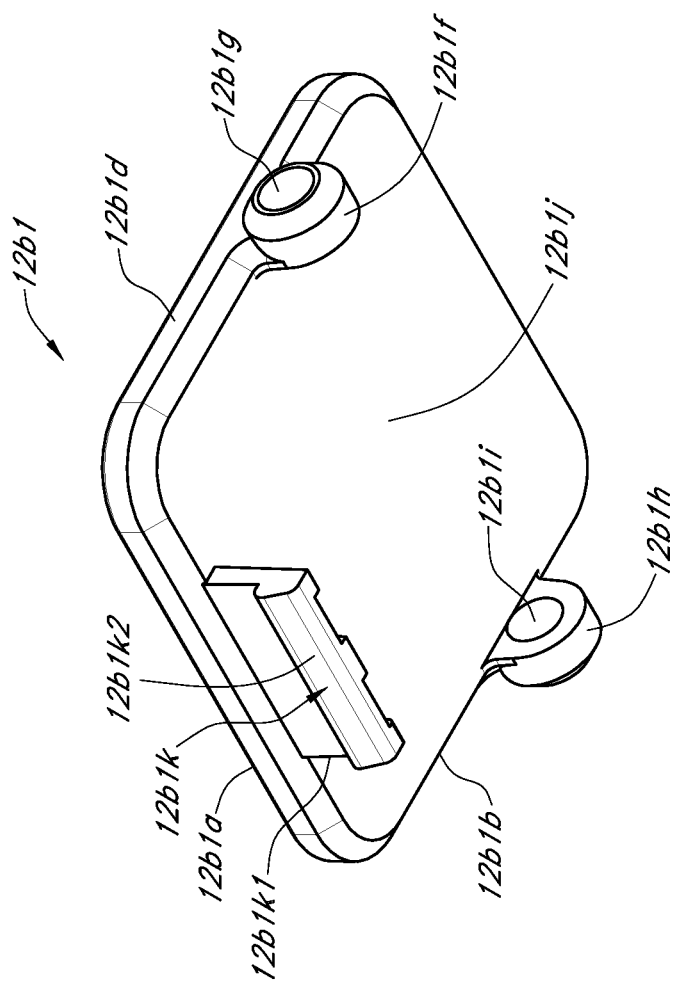
FIG. 7 is a bottom-perspective view of the cover member of FIG. 6.

Turning to FIG. 7, depicted therein is a bottom-perspective view of cover member 12b1 of cover assembly 12b. Depicted implementation of cover member 12b1 is shown to include protrusion 12b1h, aperture 12b1i, interior face 12b1j, protrusion 12b1k with stem 12b1k1 and protrusion 12b1k2.

Figure 8:
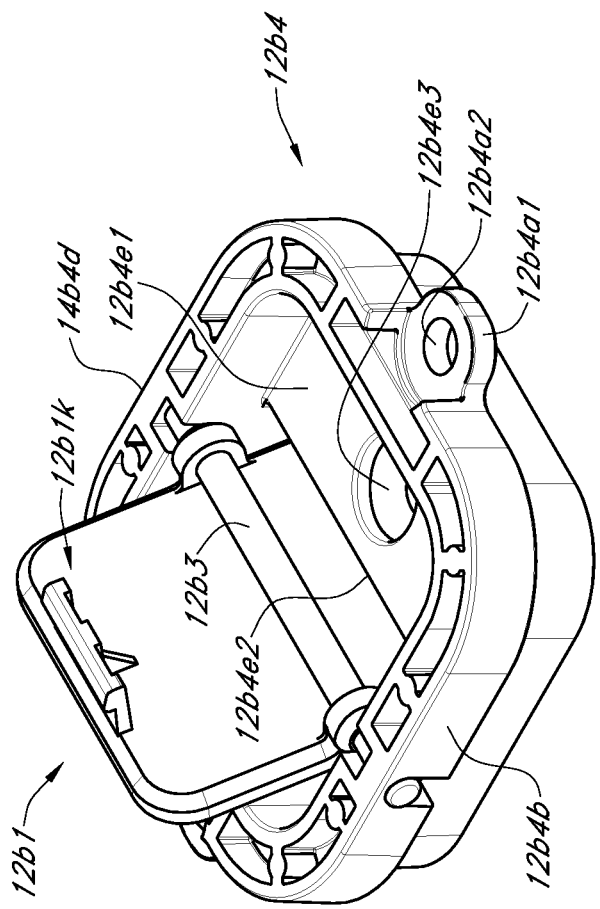
FIG. 8 is a top-perspective view of the cover assembly shown in FIG. 1 with its cover member in an open position.

Turning to FIG. 8, depicted therein is a top-perspective view of cover member 12b1 of cover assembly 12b. As shown, cover member 12b1, in an open position, is pivotally coupled with housing 12b4 by being coupled to rod 12b3 with rod 12b3 being coupled to and extending from side 12b4b to side 12b4d of housing 12b4. As shown, aperture 12b4e2 provides room for cover member 12b1 to partially protrude thereinto when cover member 12b1 is in an open position, which is also shown in FIG. 11.

Figure 9:
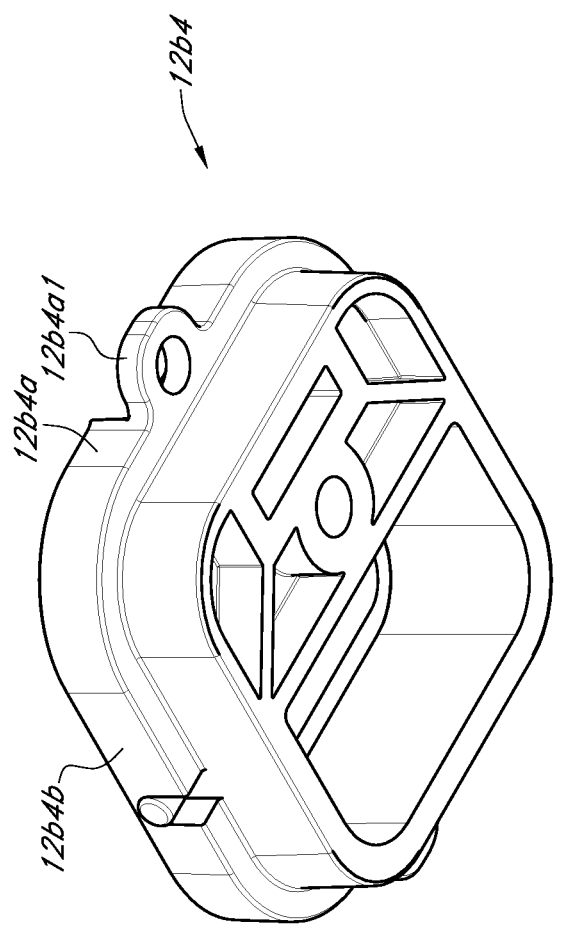
FIG. 9 is a bottom-perspective view of the cover assembly shown in FIG. 1 with its cover member in a closed position.

Turning to FIG. 9, depicted therein is a bottom-perspective view of cover member 12b1 of cover assembly 12b.

Figure 10:
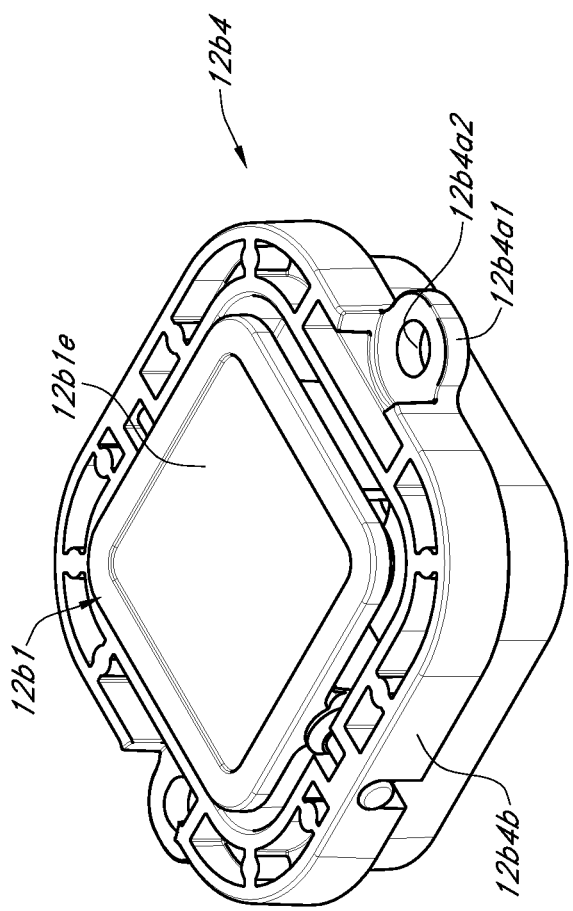
FIG. 10 is a top-perspective view of the cover assembly shown in FIG. 1 with its cover member in the closed position.

Turning to FIG. 10, depicted therein is a top-perspective view of cover member 12b1 of cover assembly 12b. As shown, cover member 12b1 is pivotally coupled with housing 12b4 via rod 12b3 in a closed position.

Figure 11:
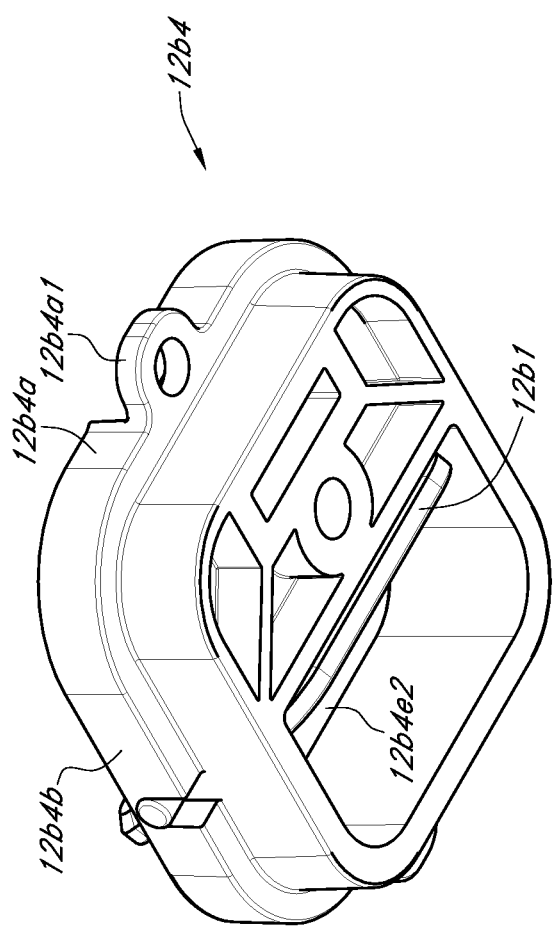
FIG. 11 is a bottom-perspective view of the cover assembly shown in FIG. 1 with its cover member in the open position.

Turning to FIG. 11, depicted therein is a bottom-perspective view of cover member 12b1 of cover assembly 12b.

Figure 12:
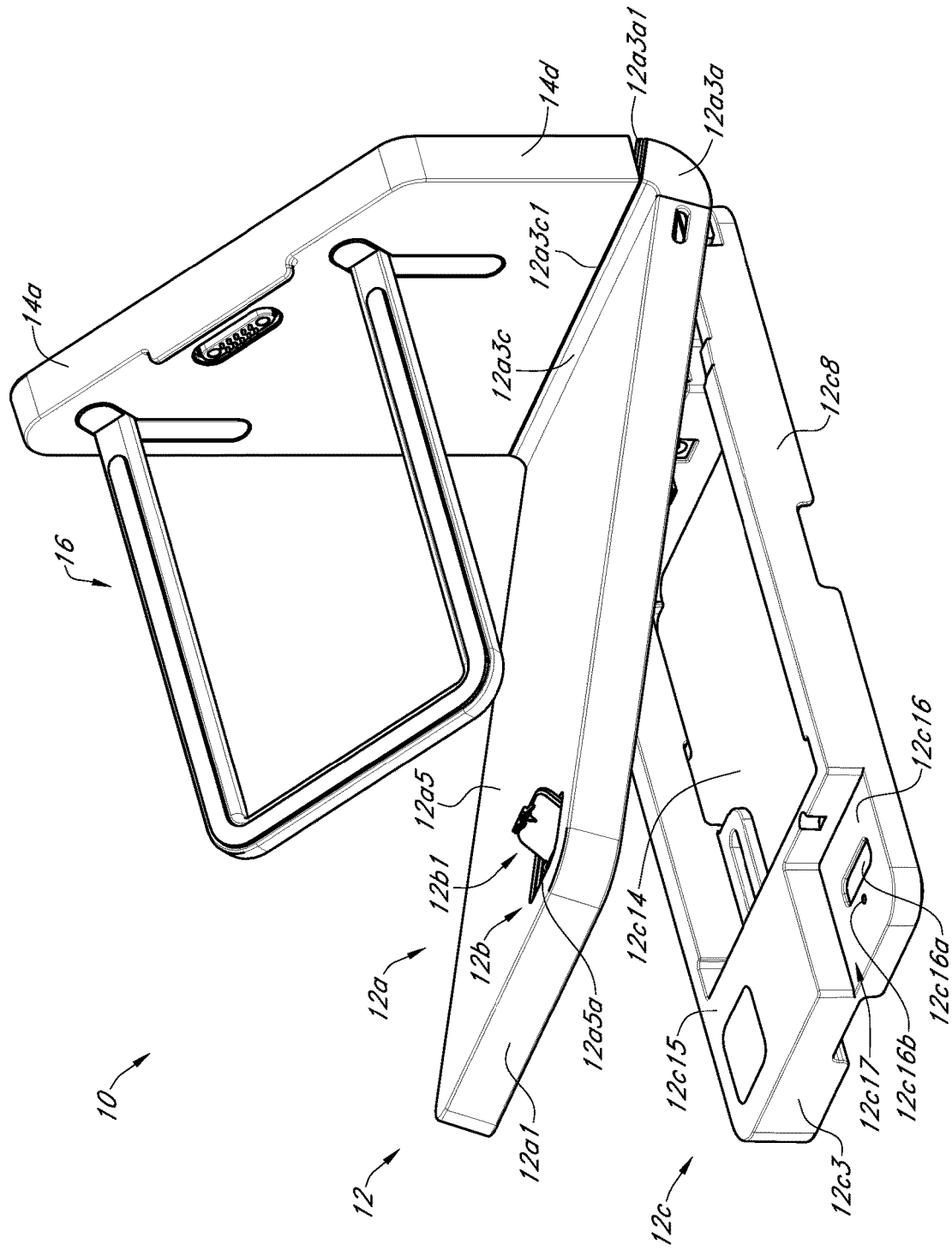
FIG. 12 is a partially exploded right-front-top perspective view of the stand assembly of FIG. 1.

Turning to FIG. 12, depicted therein is a partially exploded right-front-top perspective view of stand assembly 10. As depicted, protrusion 12a3c1 extension 12a3c of upper assembly 12a is shown being coupled with wall assembly 14 and protrusion 12a3a1 of extension 12a3a of upper assembly 12a is shown being coupled with wall assembly 14. As depicted, cover assembly 12b is shown engaged with aperture 12a5a with cover member 12b1 protruding therethrough in an open position as cover assembly 12b is coupled with upper assembly 12a.

Figure 13:
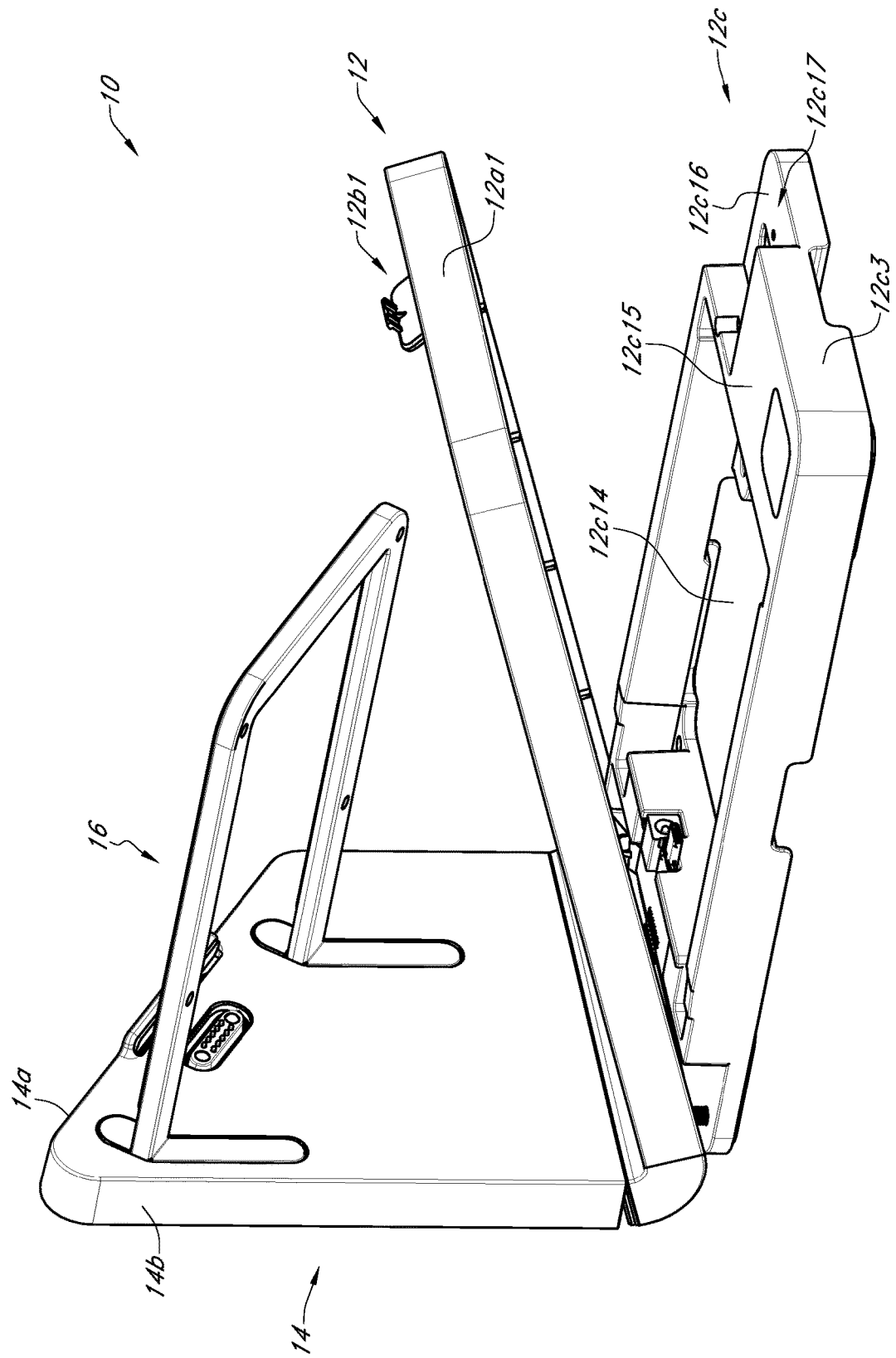
FIG. 13 is a partially exploded left-front-top perspective view of the stand assembly of FIG. 1.

Turning to FIG. 13, depicted therein is a partially exploded left-front-top perspective view of stand assembly 10.

Figure 14:
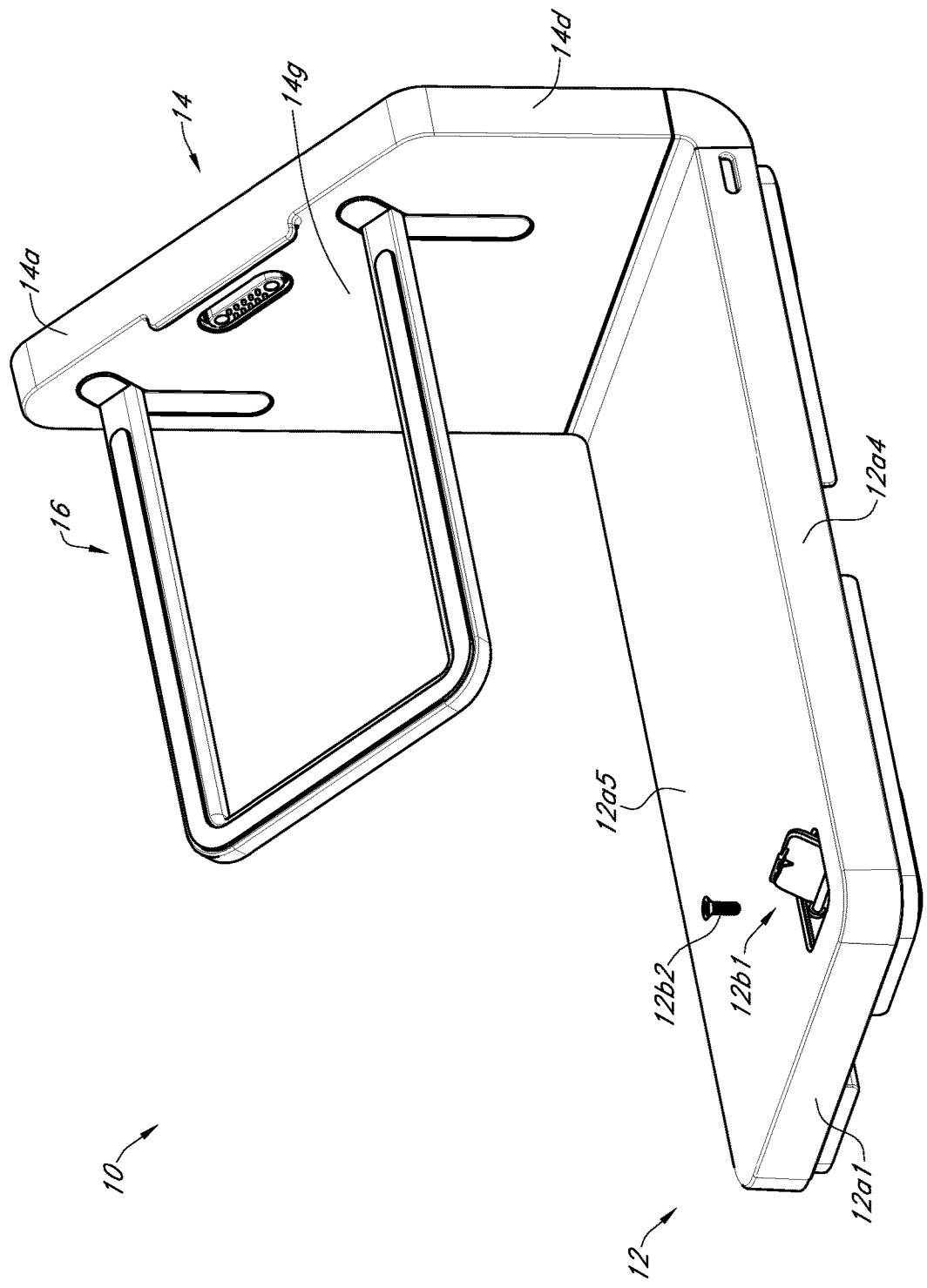
FIG. 14 is a partially exploded right-front-top perspective view of the stand assembly of FIG. 1.

Turning to FIG. 14, depicted therein is a partially exploded right-front-top perspective view of stand assembly 10. As depicted, wall assembly 14 is shown coupled to base assembly 12 with exterior face 14g of wall assembly 14 being perpendicular to exterior face 12a5 of upper assembly 12a of base assembly 12. As depicted, support assembly is shown to extend perpendicular to exterior face 14g of wall assembly 14.

Figure 15:
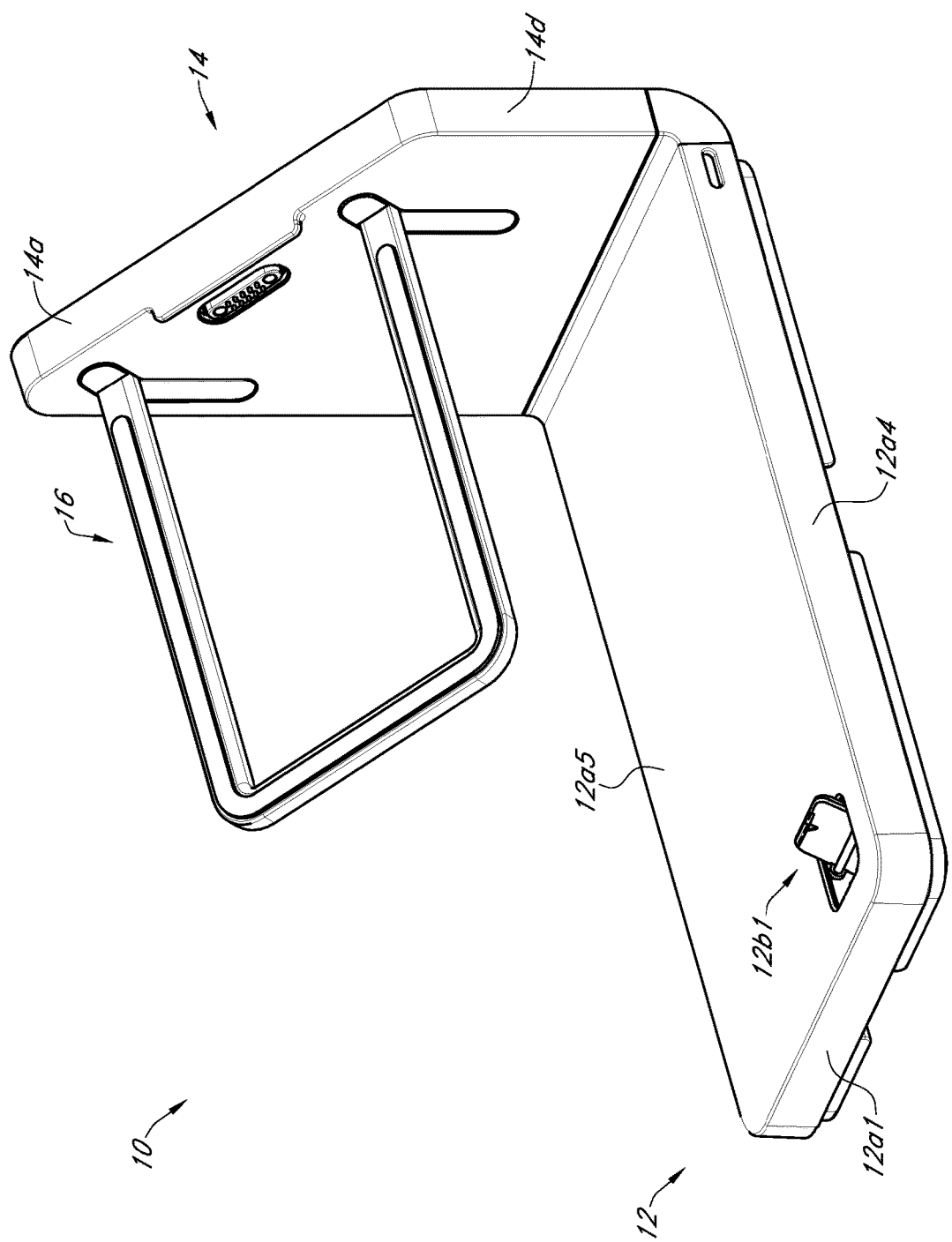
FIG. 15 is a right-front-top perspective view of the stand assembly of FIG. 1.

Turning to FIG. 15, depicted therein is a right-front-top perspective view of stand assembly 10.

Figure 16:
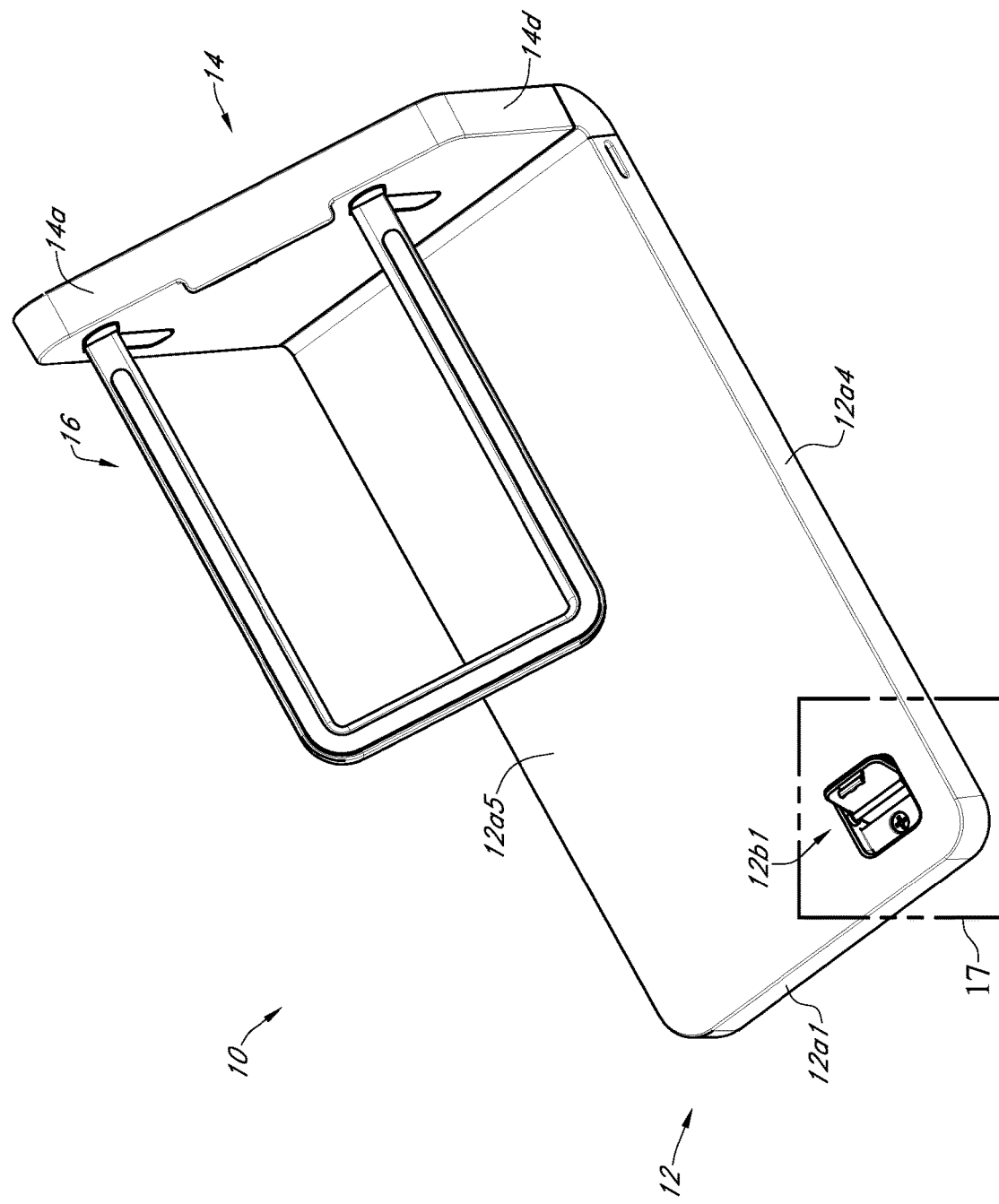
FIG. 16 is a right-front-top perspective view of the stand assembly of FIG. 1.

Turning to FIG. 16, depicted therein is a right-front-top perspective view of stand assembly 10.

Figure 17:
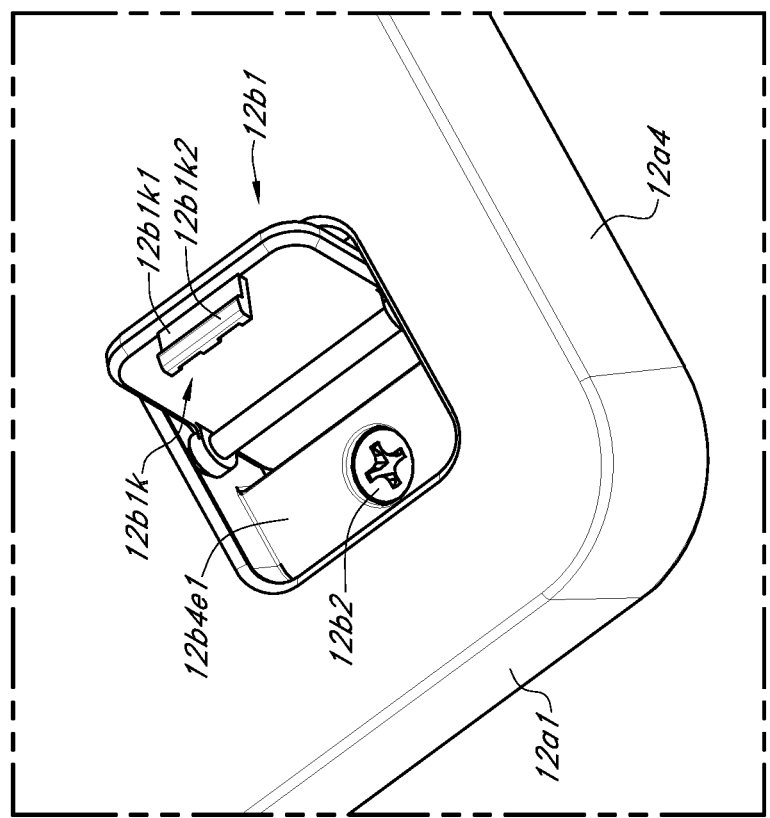
FIG. 17 is a top perspective view of a portion of the stand assembly of FIG. 1.

Turning to FIG. 17, depicted therein is a top perspective view of a portion of stand assembly 10. As depicted, cover member 12b1 is shown in an open position thereby allowing access to fastener 12b2 shown coupling upper assembly 12a to lower assembly 12c.

Figure 18:
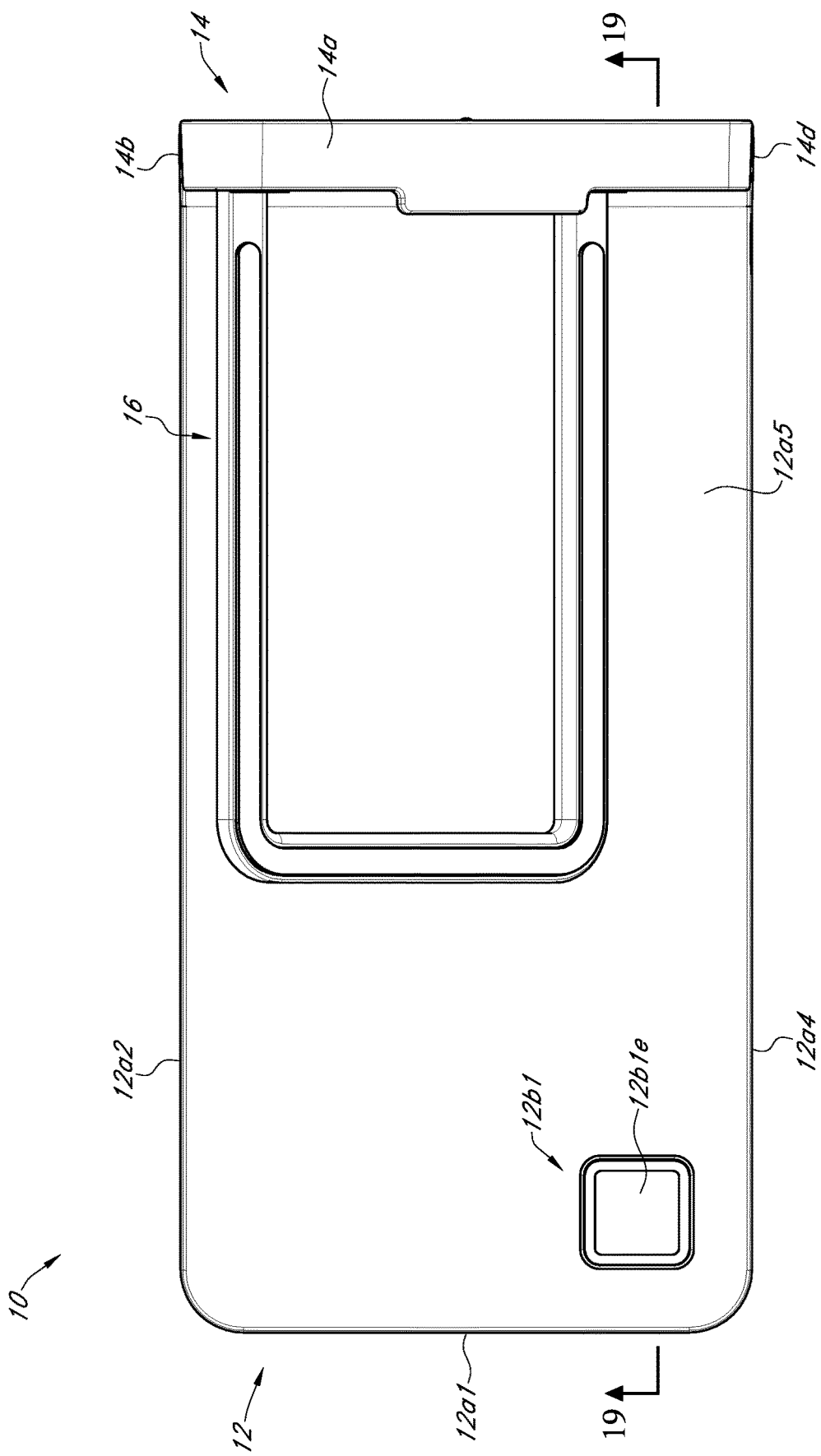
FIG. 18 is a top plan view of the stand assembly of FIG. 1.

Turning to FIG. 18, depicted therein is a top plan view of stand assembly 10. As depicted, cover member 12b1 is in a closed position thereby blocking access to fastener 12b2.

Figure 19:
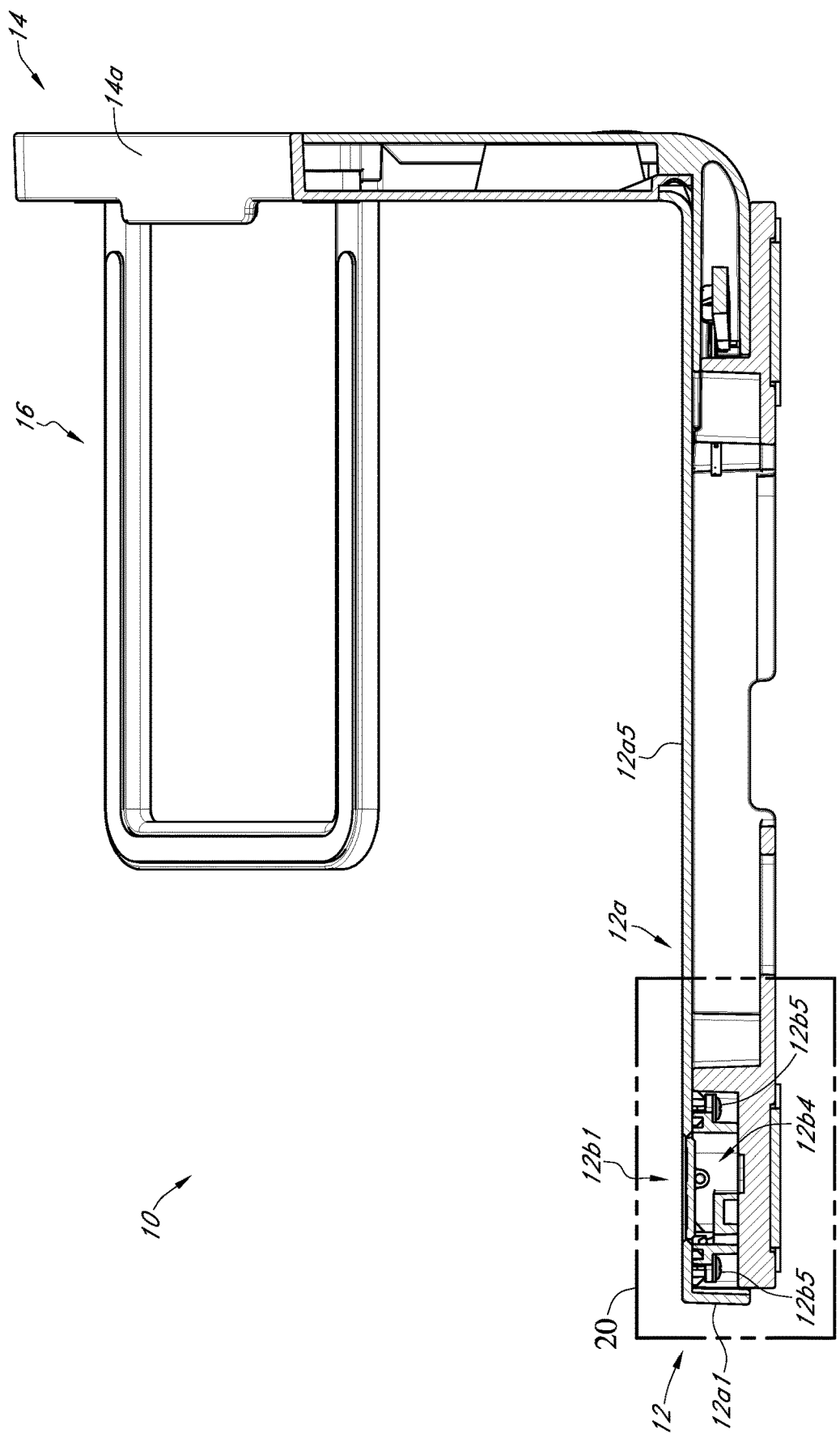
FIG. 19 is a cross-sectional side-elevational of the stand assembly of FIG. 1.

Turning to FIG. 19, depicted therein is a cross-sectional side-elevational view of stand assembly 10. As depicted, housing 12b4 of cover assembly 12b is shown coupled to upper assembly 12a by fastener 12b5.

Figure 20:
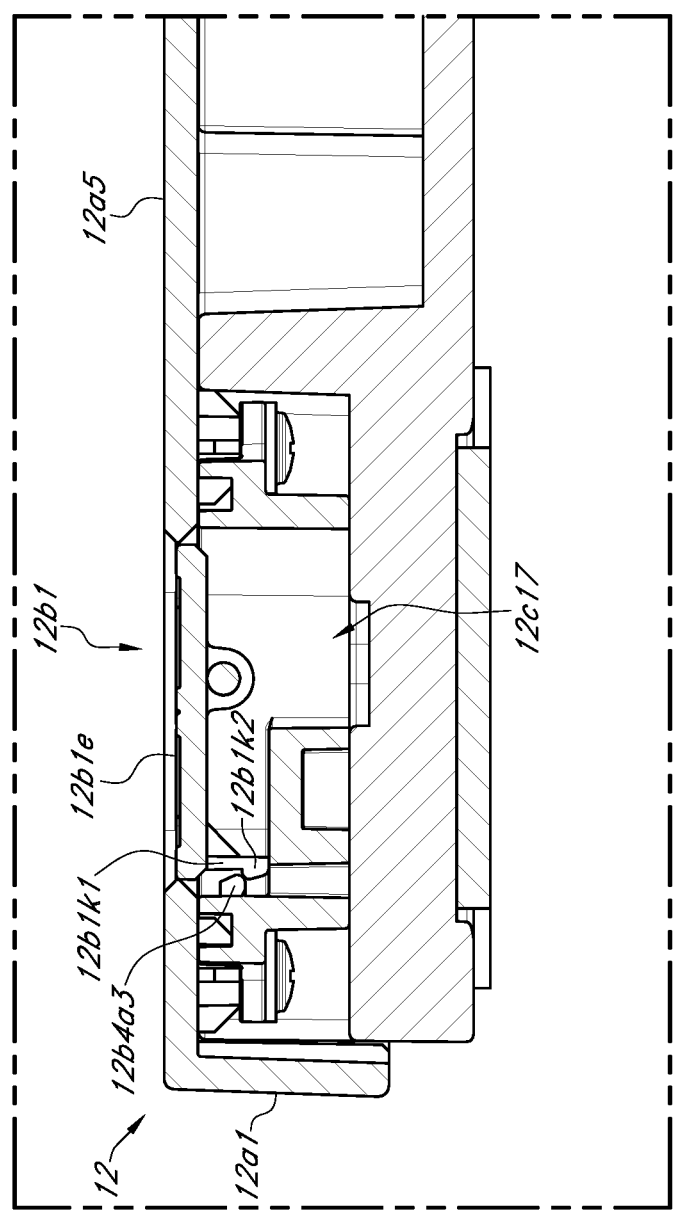
FIG. 20 is an enlarged cross-sectional side-elevational view of portion of the stand assembly of FIG. 1 taken along the 20 dashed-line area of FIG. 19 with its cover member closed.

Turning to FIG. 20, depicted therein is an enlarged cross-sectional side-elevational view of portion of stand assembly 10 taken along the 20 dashed-line area of FIG. 19 with cover member 12b1 in its closed condition with protrusion 12b1k2 of cover member 12b1 frictionally engaging with protrusion 12b4a3 of housing 12b4.

Figure 21:
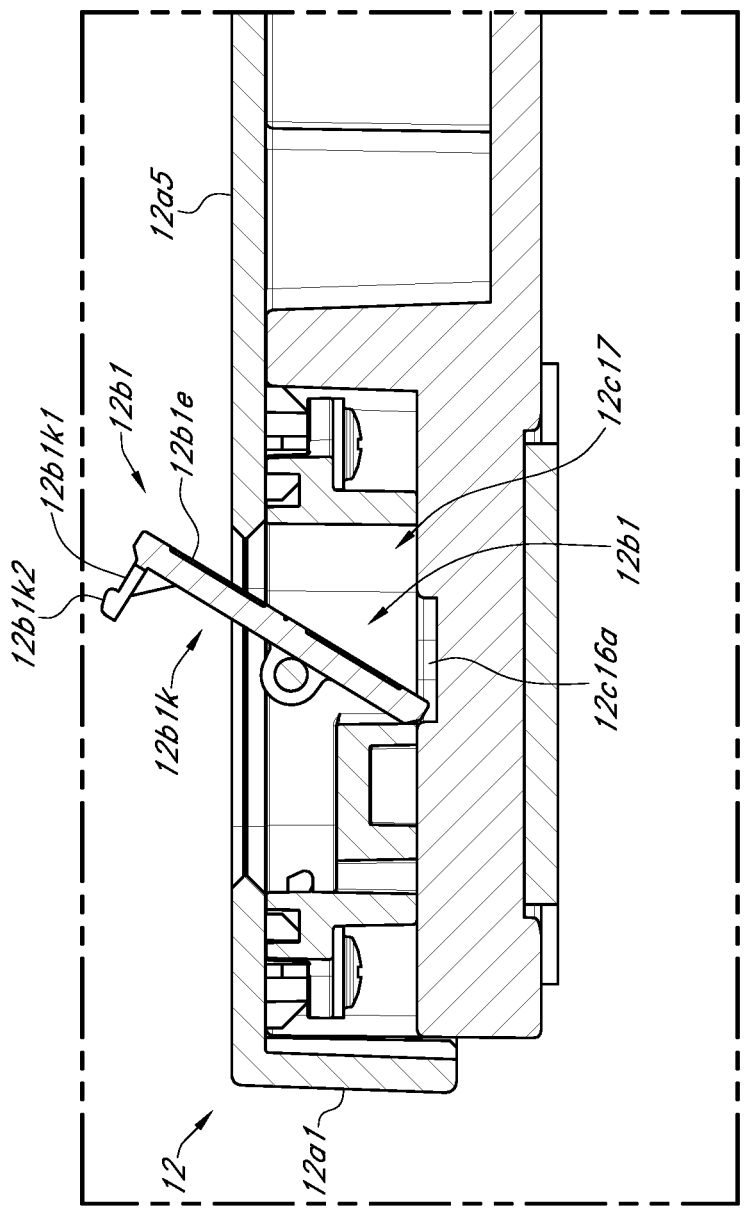
FIG. 21 is an enlarged cross-sectional side-elevational view of portion of the stand assembly of FIG. 1 taken along the 20 dashed-line area of FIG. 19 with its cover member open.

Turning to FIG. 21, depicted therein is an enlarged cross-sectional side-elevational view of portion of stand assembly 10 with cover member 12b1 in its open condition.

Figure 22:
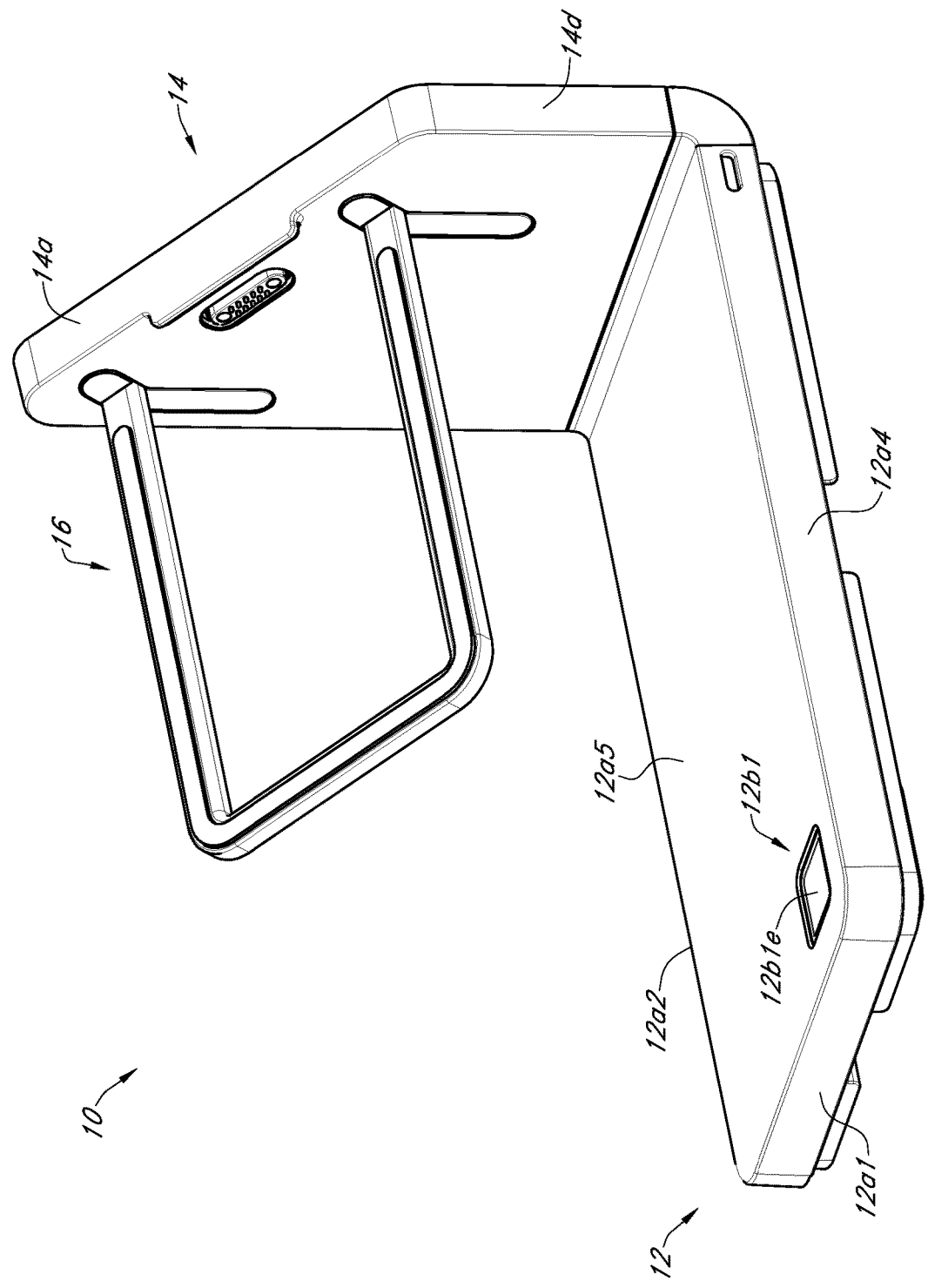
FIG. 22 is a right-front-top perspective view of the stand assembly of FIG. 1.

Turning to FIG. 22, depicted therein is a right-front-top perspective view of stand assembly 10 and stand assembly 10 coupled together.

Figure 23:
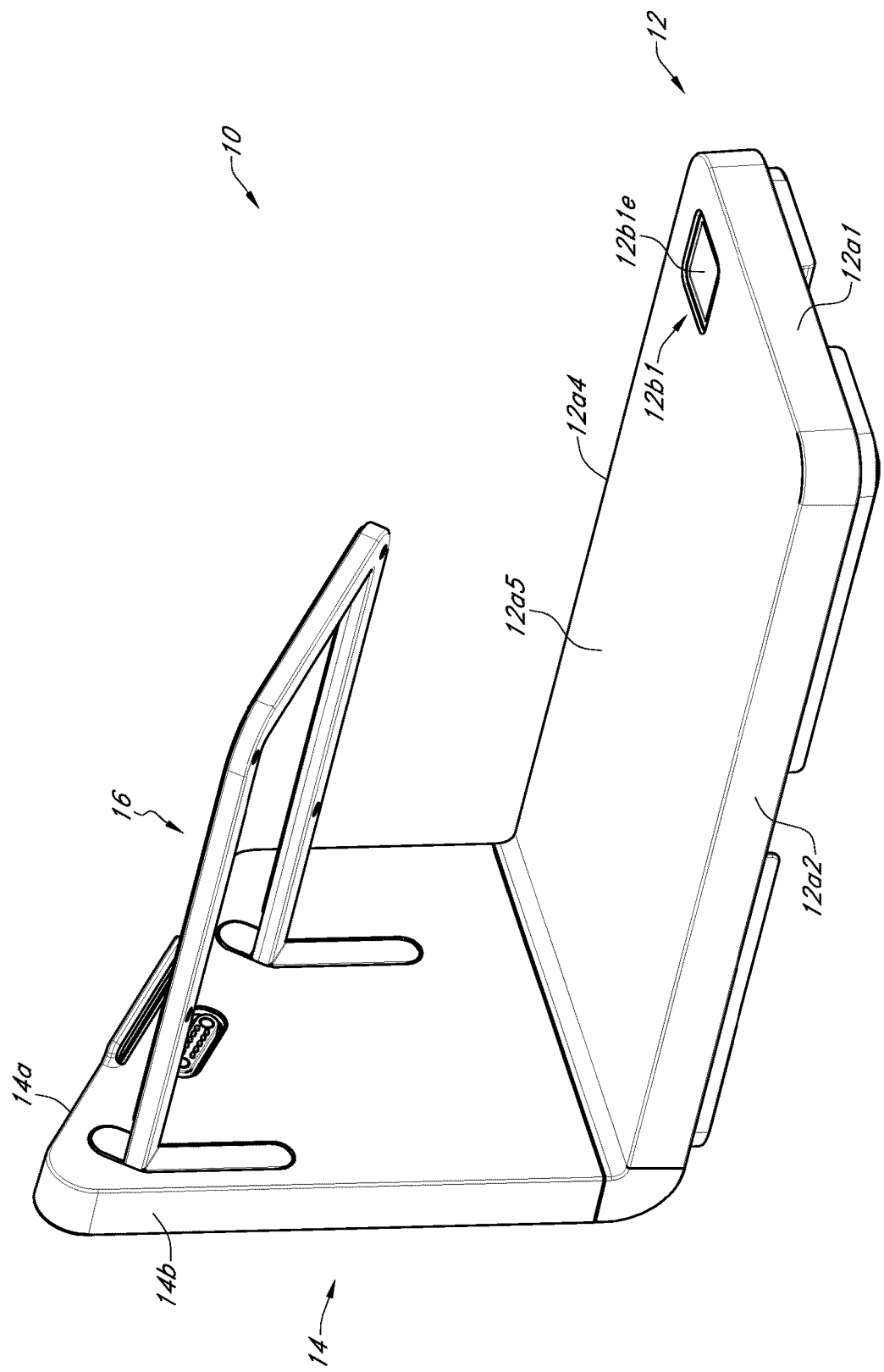
FIG. 23 is a left-front-top perspective view of the stand assembly of FIG. 1.

Turning to FIG. 23, depicted therein is a left-front-top perspective view of stand assembly 10.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to,"etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A stand system for a portable electronic device, the stand system comprising:
   (I) a base assembly including
   (A) a lower assembly,
   (B) at least one fastener,
   (C) an upper assembly including an exterior face, the upper assembly being couplable with the lower assembly via at least in part the at least one fastener, and
   (D) a cover assembly including a cover member, the cover assembly being couplable with the upper assembly, the cover member being positionable in at least a closed position and an open position when the cover assembly is coupled with the upper assembly,
   (II) a wall assembly including a wall portion with an exterior face, the wall assembly couplable to the base assembly, and
   (III) a support assembly extending perpendicularly with respect to the exterior face of the wall portion,
   wherein when the upper assembly of the base assembly is coupled to the lower assembly of the base assembly via at least in part the at least one fastener and when the cover assembly is coupled to the upper assembly, the cover member blocks access to the at least one fastener if the cover member is in the closed position and the cover member allows for access to the at least one fastener if the cover member is in the open position, and
   wherein when the upper assembly is coupled to the lower assembly of the base assembly and the wall assembly is coupled to the base assembly, the exterior face of the wall portion of the wall assembly extends perpendicularly with respect to the exterior face of the upper assembly of the base assembly.

2. The system of claim 1
   wherein the upper assembly of the base assembly includes at least one protrusion, and
   wherein the at least one protrusion of the upper assembly of the base assembly couples with the wall portion when the upper assembly of the base assembly is coupled to the wall portion.

3. The system of claim 1
   wherein the stand assembly includes a first plurality of fasteners, and
   wherein the lower assembly of the base assembly is at least coupled to the wall portion by the first plurality of fasteners when the lower assembly of the base assembly is coupled to the wall assembly.

4. The system of claim 3
   wherein the wall assembly includes an engagement member perpendicularly extending with respect to the exterior face of the wall portion, and
   wherein the first plurality of fasteners are coupled to the engagement member of the wall assembly and are coupled with the lower assembly of the base assembly when the lower assembly of the base assembly is coupled with the wall assembly.

5. The system of claim 1
   wherein the upper assembly of the base assembly includes an aperture through the exterior face of the upper assembly, and
   wherein the cover assembly is engaged with the aperture when the cover assembly is coupled with the upper assembly.

6. The system of claim 5
   wherein the cover assembly includes a housing and a cover member pivotally couplable to the housing,
   wherein the aperture of the upper assembly of the base assembly is sized to allow a portion of the cover member to protrude through the aperture when the cover assembly is coupled to the upper assembly and the cover member is in the open position as pivotally coupled to the cover assembly.

7. The system of claim 6
wherein the cover assembly provides access to the at least one fastener through the aperture of the upper assembly when the cover member of the cover assembly is in the open position and when the cover assembly and the lower assembly of the base assembly are coupled at least in part via the at least one fastener.

8. The system of claim 6
wherein the cover assembly blocks access through the aperture of the upper assembly to the at least one fastener when the cover member of the cover assembly is in the closed position and when the upper assembly and the lower assembly of the base assembly are coupled at least in part via the at least one fastener and the cover assembly is in the first position.

9. The system of claim 6
wherein the housing of the cover assembly includes a protrusion,
wherein the cover member of the cover assembly includes a protrusion, and
wherein the protrusion of the housing and the protrusion of the cover member frictionally engage one another when the cover member is in the closed position.

10. The system of claim 6
wherein the cover assembly further includes a rod,
wherein the housing of the cover assembly includes a first side and a second side,
wherein the rod is couplable with the first side and the second side of the housing,
wherein the rod extends between the first side and the second side of the housing when the rod is coupled to the first side and the second side, and
wherein the cover member is coupled to the rod when the cover member is pivotally coupled to the housing of the cover assembly.

11. The system of claim 6
wherein the cover assembly further includes at least one fastener, and
wherein housing of the cover assembly is couplable to the upper assembly via the at least one fastener of the cover assembly.

12. The system of claim 6
wherein the housing includes an aperture sized and positioned to allow a portion of the cover member to protrude through the aperture when the cover member is in the open position and pivotally coupled to the cover assembly.

13. The system of claim 6
wherein the lower assembly of the base assembly includes a notch sized and positioned to allow a portion of the cover member of the cover assembly to partially protrude into the notch when the cover assembly is coupled to the upper assembly of the base assembly, the upper assembly and lower assembly are coupled together, and the cover member is in the open position and pivotally coupled to the cover assembly.

14. The system of claim 1
wherein the lower assembly includes a nook-like portion of the lower assembly of the base assembly is shaped and sized to provide space to receive at least a portion of the housing of the cover assembly to be positioned therein when the cover assembly is coupled with the upper assembly and the upper assembly is coupled with the lower assembly.

15. A stand system for a portable electronic device, the stand system comprising:
(I) a base assembly including
(A) an upper assembly,
(B) a lower assembly,
(C) at least one fastener, and
(D) a cover assembly including a rotatably coupled cover member, wherein:
(a) the upper assembly is coupled with the lower assembly via at least in part the at least one fastener,
(b) the cover assembly is coupled with the upper assembly,
(c) the cover member of the cover assembly is rotatably coupled to move between at least a closed position and an open position,
(d) the cover member blocks access to the at least one fastener when the cover member is in the closed position, and
(e) the cover member allows for access to the at least one fastener if the cover member is in the open position.

16. The system of claim 15
wherein the upper assembly includes an aperture, and
wherein the cover assembly is accessible through the aperture,
wherein the aperture of the upper assembly of the base assembly is sized to allow a portion of the cover member to protrude through the aperture when the cover member is in the open position.

17. The system of claim 16
wherein the cover assembly provides access to the at least one fastener through the aperture of the upper assembly when the cover member of the cover assembly is in the open position, and
wherein the cover assembly blocks access to the at least one fastener through the aperture of the upper assembly when the cover member of the cover assembly is in the closed position.

18. A stand system for a portable electronic device, the stand system comprising:
(I) a base assembly including
(A) an upper assembly,
(B) a lower assembly,
(C) at least one fastener, and
(D) a cover assembly including a pivotably coupled cover member, wherein:
(a) the upper assembly is coupled with the lower assembly via at least in part the at least one fastener,
(b) the cover member of the cover assembly is rotatably coupled to move between blocking access and allowing access to the at least one fastener.

19. The system of claim 18
wherein the cover assembly further includes a housing and a rod,
wherein the housing of the cover assembly includes a first side and a second side,
wherein the rod is couplable with the first side and the second side of the housing,
wherein the rod extends between the first side and the second side of the housing when the rod is coupled to the first side and the second side, and
wherein the cover member is coupled to the rod.

20. The system of claim 19
wherein the housing includes an aperture sized and positioned to allow a portion of the cover member to protrude through the aperture of the housing when the cover member is in the open position.

* * * * *